United States Patent [19]

Hung

[11] Patent Number: 4,764,961
[45] Date of Patent: Aug. 16, 1988

[54] CASSETTE TYPE STEREO SPEAKER SYSTEM

[76] Inventor: Cheng H. Hung, 7Fl., No. 5-1, Nan King West Rd., Taipei City, China

[21] Appl. No.: 927,927
[22] Filed: Nov. 6, 1986
[51] Int. Cl.[4] ............................................. H04R 5/02
[52] U.S. Cl. ...................................... 381/24; 381/90; 381/205; 381/188
[58] Field of Search ...................... 369/10, 86; 381/24, 381/88, 90, 188, 191, 194, 195, 205

[56] References Cited

U.S. PATENT DOCUMENTS 3,991,369 11/1976 Fujimoto ............................... 369/10
4,303,807 12/1981 Sato ...................................... 381/205
4,365,280 12/1982 Crosetti et al. ....................... 369/10

FOREIGN PATENT DOCUMENTS 2532238 1/1976 Fed. Rep. of Germany ........ 369/10

Primary Examiner—Forester W. Isen

[57] ABSTRACT

A cassette type stereo speaker system comprises a body case, a screen, a vibrating sheet, a voice coil, a magnetic path system and a plug. The magnetic path system includes a yoke iron, a center magnet, and a ferrite magnet. The vibrating sheet is a very thin sheet to be mounted over the voice coil. The whole speaker system has the features of being simple in structure, and being convenient to a user to carry or to store it.

1 Claim, 2 Drawing Sheets

CASSETTE TYPE STEREO SPEAKER SYSTEM

BACKGROUND OF THE INVENTION

1. Field of the Invention

This invention relates to a cassette type of 2-channel stereo speaker system, particularly a tape recorder cassette in outer form so as to fit in a Walkman set in a portable manner and being convenient for storage.

2. Prior Art

Most of the conventional loud speakers take a considerable space and have a considerable weight. In the current portable Walkman set, there is no speaker being furnished; instead, an earphone is used through a plug and a jack by the user to enjoy music. If a user wants to connect a speaker with a Walkman set for listening pleasure, the whole set can only be placed at a given location, being incapable of providing the Walkman set convenience.

SUMMARY OF THE INVENTION

In view of the drawbacks of the conventional speaker, the inventor has developed a small and light speaker to be used together with the current Walkman set for portable and storage convenience.

The prime object of the present invention is to provide a speaker, in which the driving element system includes a thin vibrating sheet mounted over the voice coil and a screen mounted over the vibrating sheet for protection purpose.

Another object of the present invention is to provide a speaker, in which the driving element system is furnished with a thin vibrating sheet being mounted on the voice coil; then, a screen is mounted over the vibrating sheet for protection purpose.

Still another object of the present invention is to provide a speaker, in which a magnetic path system is installed in the two round holes; the magnetic path system includes two sets of yoke irons, ferrite magnets, and center magnets.

A further object of the present invention is to provide a speaker, which is connected together with a Walkman set, and of which two wires of the plug are soldered with the two wires of the voice coils respectively. The plug is mounted in the center portion of the body case, and can be turned at an angle of 90° so as to tuck away in the body case for storage and carrying convenience.

DETAILED DESCRIPTION OF A PREFERRED EMBODIMENT

Figure 1:
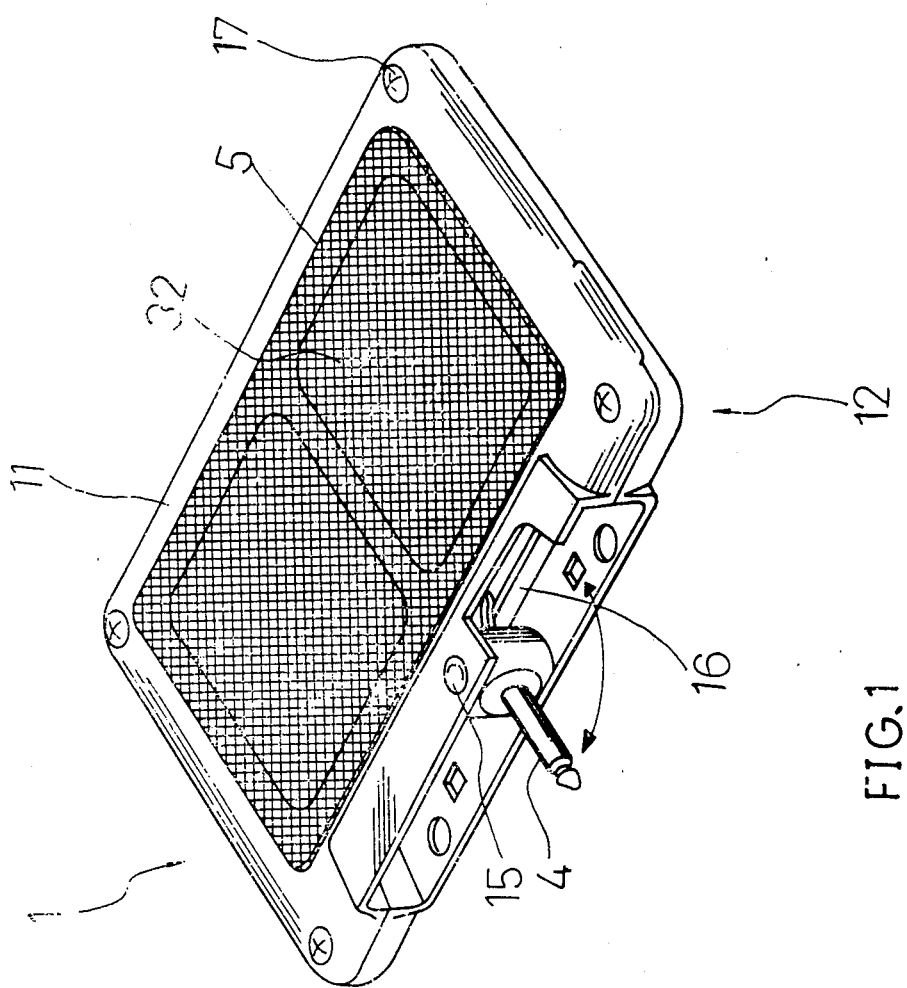
FIG. 1 is a perspective view of the embodiment according to the present invention.
Figure 2:
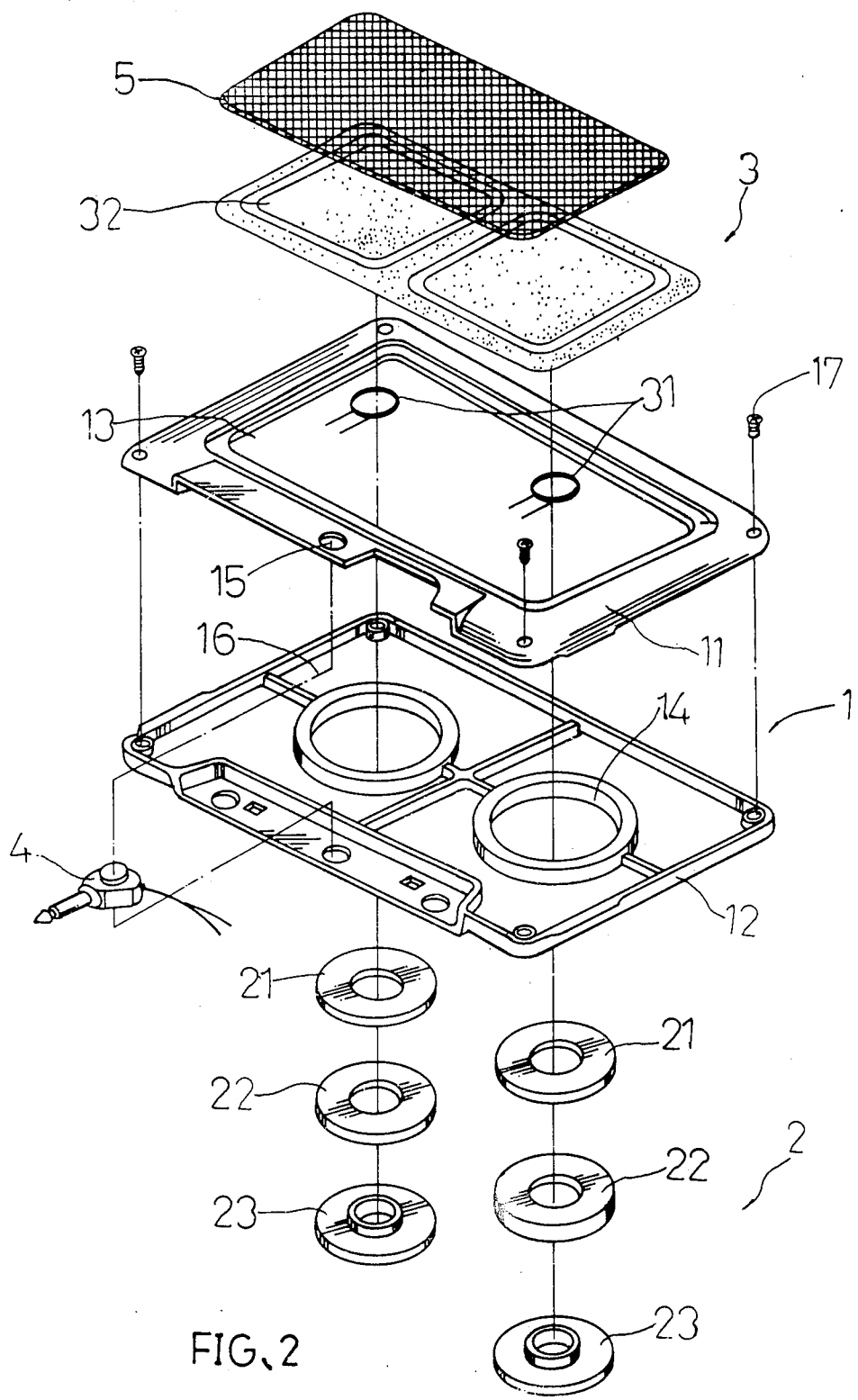
FIG. 2 is a disassembled view of the present invention.

As shown in FIGS. 1 and 2, the present invention comprises a body case 1, a magnetic path system 2, a driving element system 3, a 2-channel plug 4, and a screen 5. The body case 1 includes an upper case portion 11 and a lower case portion 12. A ferrite magnet 22 is fixedly mounted, with epoxy resin, between a yoke iron 21 and a center magnet 23; then, a magnetic path system 2 including the yoke iron 21, the ferrite magnet 22, and the center magnet 23 are mounted in the round hole 14 of the lower case portion 12, being glued in position. The driving element system 3 including a voice coil 31 and a vibrating sheet 32 are glued in the rectangular aperture 13 of the upper case portion 11. The two wires of the 2-channel plug are soldered with the two wires of the voice coil 31 respectively. The plug 4 which can be turned 90° is mounted in a small hole 15 in the front edges of the upper and lower case portions 11 and 12. The front edge of the upper case portion 11 is furnished with a cut portion 16 for placing the plug 4. The upper and lower case portions 11 and 12 are assembled together with screws 17. Finally, the screen 5 is adhered on the top side of the upper case portion 11 for protecting the vibrating sheet 32.

Briefly, since the present invention has a simple structure, and a compact dimensions, it is portable and convenient to a user to enjoy music.

I claim:

1. A stereo speaker system comprising a body case, a plug to receive audio signals, a driving element system connected to receive signals from said plug, and a magnetic path system, said driving element and magnetic path system cooperating to form a stereo speaker means, further characterized in that said body case has the size and shape of a standard audio cassette, and said plug can be tucked away inside said body case when not in use, whereby said stereo speaker system can be inserted into a standard cassette tape recorder for storage.

* * * * *

REEXAMINATION CERTIFICATE (1391st)
United States Patent [19]
Hung

[11] B1 4,764,961
[45] Certificate Issued  Dec. 4, 1990

[54] CASSETTE TYPE STEREO SPEAKER SYSTEM

[75] Inventor: Cheng H. Hung, Taipei City, Taiwan

[73] Assignee: Cotron Corp., Taipei, Taiwan

Reexamination Request:
No. 90/001,871, Oct. 26, 1989

Reexamination Certificate for:
Patent No.: 4,764,961
Issued: Aug. 16, 1988
Appl. No.: 927,927
Filed: Nov. 6, 1986

[51] Int. Cl.$^5$ .............................. H04R 5/02
[52] U.S. Cl. ........................ 381/24; 381/90; 381/188; 381/205
[58] Field of Search ............... 381/24, 88, 89, 90, 381/188, 205

[56] References Cited
U.S. PATENT DOCUMENTS

| | | | |
|---|---|---|---|
| 3,991,369 | 11/1926 | Fujimoto | 369/10 |
| 4,088,849 | 5/1978 | Usami et al. | 381/25 |
| 4,245,136 | 1/1981 | Krauel, Jr. | 381/25 |
| 4,303,807 | 12/1981 | Sato | 381/205 |
| 4,365,280 | 12/1982 | Crosetti et al. | 369/10 |

FOREIGN PATENT DOCUMENTS 2532238  1/1976  France .................. 369/10

OTHER PUBLICATIONS

Cotron Corporation Advertisement (publication) prior to Nov. 6th, 1986.

Primary Examiner—Forester W. Isen

[57] ABSTRACT

A cassette type stereo speaker system comprises a body case, a screen, a vibrating sheet, a voice coil, a magnetic path system and a plug. The magnetic path system includes a yoke iron, a center magnet, and a ferrite magnet. The vibrating sheet is a very thin sheet to be mounted over the voice coil. The whole speaker system has the features of being simple in structure, and being convenient to a user to carry or to store it.

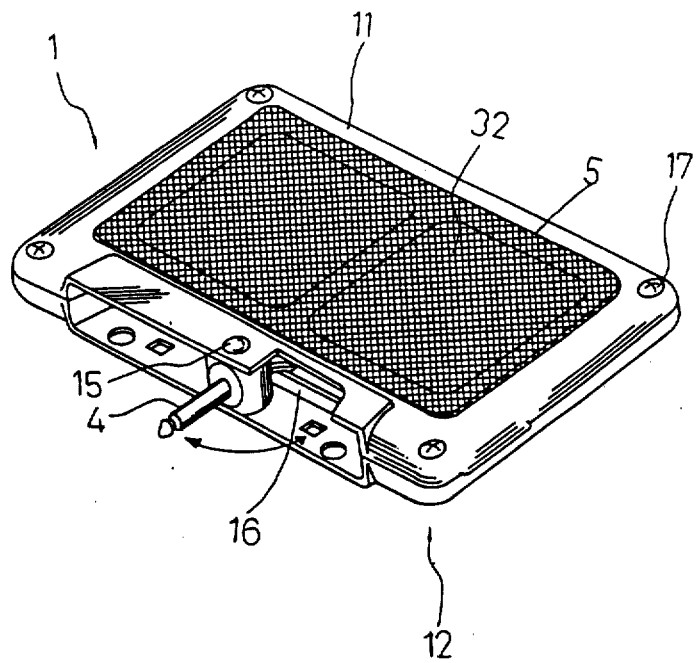

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, line 11 to line 34.

As shown in FIGS. 1 and 2, the present invention comprises a body case 1, a magnetic path system 2, a driving element system 3, a 2-channel plug 4, and a screen 5. *Together the magnetic path system 2 and the driving element system 3 form a pair of stereo loudspeakers.* The body case 1 includes an upper case portion 11 and a lower case portion 12. A ferrite magnet 22 is fixedly mounted, with epoxy resin, between a yoke iron 21 and a center magnet 23; then, a magnetic path system 2 including the yoke iron 21, the ferrite magnet 22, and the center magnet 23 are mounted in the round hole 14 of the lower case portion 12, being glued in position. The driving element system 3 including a voice coil 31 and a vibrating sheet 32 are glued in the rectangular aperture 13 of the upper case portion 11. The two wires of the 2-channel plug are soldered with the two wires of the voice coil 31 respectively. The plug 4 which can be turned 90° is mounted in a small hole 15 in the front edges of the upper and lower case portions 11 and 12. The front edge of the upper case portion 11 is furnished with a cut portion 16 for placing the plug 4. The upper and lower case portions 11 and 12 are assembled together with screws 17. Finally, the screen 5 is adhered on the top side of the upper case portion 11 for protecting the vibrating sheet 32.

AS A RESULT OF REEXAMINATION, IT HAS BEEN DETERMINED THAT:

Claim 1 is determined to be patentable as amended.

New claims 2–8 are added and determined to be patentable.

1. A stereo speaker system comprising a body case, a plug to receive audio signals, a driving element system connected to receive signals from said plug, and a magnetic path system, said driving element and said magnetic path system cooperating to form a stereo speaker means, *said stereo speaker means being mounted in said body case so as to be permanently attached to said body case for listening and storage,* further characterized in that said body case has the size and shape of a standard audio cassette, and said plug can be tucked away inside said body case when not in use, whereby said stereo speaker system can be inserted into a standard cassette tape recorder for storage.

2. *A stero speaker system as in claim 1, wherein said plug is pivotally mounted on said body case so that said plug can be pivoted between a use position in which said plug extends outwardly of said body case and a storage position in which said plug is entirely disposed within an outer perimeter of said body case.*

3. *A stereo speaker system comprising:*
   *a body case;*
   *a plug to receive audio signals;*
   *a driving element system coupled to said plug to receive signals from said plug; and*
   *a magnetic path system;*
   *wherein said driving element system and said magnetic path system cooperate to form a stereo speaker means, said stereo speaker means being a pair of loudspeakers mounted in said body case so as to be permanently attached to said body case for listening and storage, said body case has the size and shape of a standard audio cassette, and said plug can be tucked away inside said body case when not in use, whereby said stereo speaker system can be inserted into a standard cassette tape recorder for storage.*

4. *A stereo speaker system as in claim 3, wherein said plug is pivotally mounted on said body case so that said plug can be pivoted between a use position in which said plug extends outwardly of said body case and a storage position in which said plug is entirely disposed within an outer perimeter of said body case.*

5. *A stereo speaker system comprising:*
   *a body case;*
   *a plug to receive audio signals;*
   *a driving element system within said body case coupled to said plug to receive signals from said plug; and*
   *a magnetic path system within said body case;*
   *wherein said driving element system and said magnetic path system cooperate to form a stereo speaker means mounted in said body case so as to be permanently attached to said body case, said body case has the size and shape of a standard audio cassette, and said plug can be tucked away inside said body case when not in use, whereby said stereo speaker system can be inserted into a standard cassette tape recorder for storage.*

6. *A stereo speaker system as in claim 5, wherein said plug is pivotally mounted on said body case so that said plug can be pivoted between a use position in which said plug extends outwardly of said body case and a storage position in which said plug is entirely disposed within an outer perimeter of said body case.*

7. *A stereo speaker system comprising a body case having a first case portion and a second case portion fastened to said first case portion, a plug to receive audio signals, a driving element system connected to receive signals from said plug, and a magnetic path system, said driving element system and said magnetic path system cooperating to form a pair of stereo speakers mounted between said first case portion and said second case portion so as to be enclosed by said body case, wherein said body case has the size and shape of a standard audio cassette, and said plug can be tucked away inside said body case when not in use, whereby said stereo speaker system can be inserted into a standard cassette tape recorder for storage.*

8. *A stereo speaker system as in claim 7, wherein said plug is pivotally mounted on said body case so that said plug can be pivoted between a use position in which said plug extends outwardly of said body case and a storage position in which said plug is entirely disposed within an outer perimeter of said body case.*

* * * * *